United States Patent
Chorn et al.

(10) Patent No.: US 11,821,408 B2
(45) Date of Patent: Nov. 21, 2023

(54) SYSTEMS AND METHODS FOR GEOTHERMAL ENERGY GENERATION WITH TWO-PHASE WORKING FLUID

(71) Applicant: TerraCOH Inc., Bloomington, MN (US)

(72) Inventors: Larry G. Chorn, Golden, CO (US); Philip Arthur Pogge, Eden Prairie, MN (US)

(73) Assignee: TERRACOH INC., Bloomington, MN (US)

( * ) Notice: Subject to any disclaimer, the term of this patent is extended or adjusted under 35 U.S.C. 154(b) by 0 days.

(21) Appl. No.: 17/748,578

(22) Filed: May 19, 2022

(65) Prior Publication Data
US 2022/0373230 A1 Nov. 24, 2022

Related U.S. Application Data

(60) Provisional application No. 63/190,620, filed on May 19, 2021.

(51) Int. Cl.
*F03G 4/00* (2006.01)
*F24T 10/20* (2018.01)
*F03G 7/04* (2006.01)

(52) U.S. Cl.
CPC ............ *F03G 4/026* (2021.08); *F03G 7/04* (2013.01); *F24T 10/20* (2018.05); *Y02E 10/10* (2013.01)

(58) Field of Classification Search
CPC ......... F03G 7/04–047; F03G 4/00–074; Y02E 10/10
See application file for complete search history.

(56) References Cited

U.S. PATENT DOCUMENTS 4,357,802 A * 11/1982 Wahl, III ............... F24T 10/20
60/641.5
2011/0088896 A1 4/2011 Preston
(Continued)

OTHER PUBLICATIONS

"International Application Serial No. PCT/US2022/030063, International Search Report dated Aug. 17, 2022", 3 pgs.
(Continued)

*Primary Examiner* — Laert Dounis
(74) *Attorney, Agent, or Firm* — SCHWEGMAN LUNDBERG & WOESSNER, P.A.

(57) ABSTRACT

A system comprises a production well having an inlet in fluid communication with an underground reservoir, wherein the reservoir is at a first temperature and contains a native aqueous solution, a working fluid withdrawn from the reservoir into the inlet and through the production well. The working fluid comprises a non-water component and an aqueous component comprising a portion of the aqueous solution. The system further comprises a separation apparatus in communication with the production well configured to separate the aqueous component from the working fluid to provide a dewatered working fluid, wherein the aqueous component is from more than 0 wt. % to no more than a specified threshold of the dewatered working fluid. The system also includes an energy recovery system that comprises an expansion device through which the dewatered working fluid passes and produces work energy and a generator that converts the work energy to electricity.

11 Claims, 1 Drawing Sheet

(56) References Cited

U.S. PATENT DOCUMENTS

| | | |
|---|---|---|
| 2012/0067568 A1 | 3/2012 | Palmer et al. |
| 2012/0312545 A1 | 12/2012 | Suryanarayana et al. |
| 2013/0043678 A1 | 2/2013 | Saar et al. |
| 2014/0130498 A1* | 5/2014 | Randolph ............. E21B 43/164 |
| | | 166/267 |
| 2020/0347707 A1 | 11/2020 | Bowdon et al. |
| 2021/0140684 A1 | 5/2021 | Younes et al. |
| 2022/0373230 A1* | 11/2022 | Chorn .................... F24T 10/20 |

OTHER PUBLICATIONS

"International Application Serial No. PCT/US2022/030063, Written Opinion dated Aug. 17, 2022", 5 pgs.

\* cited by examiner

SYSTEMS AND METHODS FOR GEOTHERMAL ENERGY GENERATION WITH TWO-PHASE WORKING FLUID

CROSS REFERENCE TO RELATED APPLICATIONS

This application claims the benefit of priority to U.S. Provisional Patent Application Ser. No. 63/190,620 entitled "SYSTEMS AND METHODS FOR GEOTHERMAL ENERGY GENERATION WITH TWO-PHASE WORKING FLUID," filed May 19, 2021, the disclosure of which is incorporated by reference herein in its entirety.

BACKGROUND

In light of global climate change and in response to an increased desire to reduce dependence on foreign oil supplies, renewable energy systems, such as wind, solar and geothermal-based systems are being increasingly researched and developed. In addition, in response to rapidly increasing carbon dioxide levels in the atmosphere, systems for removal, usage, and, optionally, sequestration of carbon dioxide are also being actively researched. However, many renewable systems have only limited potential due to, for example, high costs, overall process inefficiencies, and possible adverse environmental impact.

SUMMARY OF THE DISCLOSURE

In an example, the present disclosure describes a system comprising a production well having a production well inlet in fluid communication with an underground reservoir and a production well outlet, wherein the underground reservoir is at a first temperature and contains a native fluid comprising an aqueous solution, a working fluid that is withdrawn from the underground reservoir into the production well inlet and through the production well to the production well outlet, wherein the working fluid comprises a non-water component and an aqueous component, wherein the aqueous component comprises a portion of the aqueous solution, a separation apparatus in fluid communication with the production well outlet, wherein the separation apparatus is configured to separate a portion of the aqueous component from the working fluid to provide a dewatered working fluid, wherein the aqueous component is from more than 0 wt. % to no more than a specified threshold of the dewatered working fluid, and an energy recovery system for converting energy in the dewatered working fluid to electricity, wherein the energy recovery system comprises an expansion device in fluid communication with the separation apparatus so that the dewatered working fluid passes through the expansion device to produce work energy, and a generator that converts the work energy produced by the expansion device to electricity.

In another example, the present disclosure describes a method comprising flowing a non-water based working fluid through an underground reservoir, the underground reservoir being at a first temperature, wherein the underground reservoir contains a native fluid comprising an aqueous solution, wherein exposure of the non-water based working fluid to the native fluid causes at least a portion of the aqueous solution to mix with the non-water based working fluid to form a production fluid comprising a non-water component and an aqueous component, wherein the non-water component comprises the non-water based working fluid and the aqueous component comprises the aqueous solution, wherein exposure of the production fluid to the first temperature heats the production fluid to a second temperature, flowing the production fluid at the second temperature through a production well to produce the production fluid, separating a portion of the aqueous component from the non-water component to provide a dewatered working fluid, wherein aqueous component is more than 0 wt. % and no more than a specified threshold of the dewatered working fluid, and converting heat energy in the dewatered working fluid to electricity.

BRIEF DESCRIPTION OF THE DRAWING

The drawing illustrates generally, by way of example, but not by way of limitation, various embodiments discussed in the present document.

DETAILED DESCRIPTION

The following detailed description includes references to the accompanying drawings, which form a part of the detailed description. The drawings show, by way of illustration, specific embodiments in which the invention may be practiced. These embodiments, which are also referred to herein as "examples," are described in enough detail to enable those skilled in the art to practice the invention. The example embodiments may be combined, other embodiments may be utilized, or structural, and logical changes may be made without departing from the scope of the present invention. While the disclosed subject matter will be described in conjunction with the enumerated claims, it will be understood that the exemplified subject matter is not intended to limit the claims to the disclosed subject matter. The following detailed description is, therefore, not to be taken in a limiting sense, and the scope of the present invention is defined by the appended claims and their equivalents.

The present disclosure describes a geothermal energy recovery system that uses a working fluid that primarily comprises a non-water working fluid component, such as carbon dioxide ($CO_2$), as well as a small percentage, e.g., up to about 10 wt. %, of an aqueous component, such as brine, for the recovery and conversion of geothermal energy to electricity. The geothermal energy recovery systems and methods can include aspects of the example systems and methods disclosed in the following: U.S. Pat. No. 8,316,955, entitled "CARBON DIOXIDE-BASED GEOTHERMAL ENERGY GENERATION SYSTEMS AND METHODS RELATED THERETO;" U.S. Pat. No. 8,991,510, entitled "CARBON DIOXIDE-BASED GEOTHERMAL ENERGY GENERATION SYSTEMS AND METHODS RELATED THERETO;" U.S. Pat. No. 9,869,167, entitled "CARBON DIOXIDE-BASED GEOTHERMAL ENERGY GENERATION SYSTEMS AND METHODS RELATED THERETO;" and U.S. Provisional Patent Application Ser. No. 62/706,518 to Phil Pogge, et al., filed on Aug. 21, 2020, entitled "POWER GENERATION FROM SUPERCRITICAL CARBON DIOXIDE," the disclosures of which are incorporated herein by reference in their entireties.

References in the specification to "one embodiment", "an embodiment," "an example embodiment," etc., indicate that the embodiment described can include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a concentration range of "about 0.1% to about 5%" should be interpreted to include not only the explicitly recited concentration of about 0.1 wt. % to about 5 wt. %, but also the individual concentrations (e.g., 1%, 2%, 3%, and 4%) and the sub-ranges (e.g., 0.1% to 0.5%, 1.1% to 2.2%, and 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. Unless indicated otherwise, the statement "at least one of" when referring to a listed group is used to mean one or any combination of two or more of the members of the group. For example, the statement "at least one of A, B, and C" can have the same meaning as "A; B; C; A and B; A and C; B and C; or A, B, and C," or the statement "at least one of D, E, F, and G" can have the same meaning as "D; E; F; G; D and E; D and F; D and G; E and F; E and G: F and G; D, E, and F; D, E, and G; D, F, and G; E, F, and G; or D, E, F, and G." A comma can be used as a delimiter or digit group separator to the left or right of a decimal mark; for example, "0.000.1"" is equivalent to "0.0001."

In the methods described herein, the steps can be carried out in any order without departing from the principles of the invention, except when a temporal or operational sequence is explicitly recited. Furthermore, specified steps can be carried out concurrently unless explicit language recites that they be carried out separately. For example, a recited act of doing X and a recited act of doing Y can be conducted simultaneously within a single operation, and the resulting process will fall within the literal scope of the process. Recitation in a claim to the effect that first a step is performed, and then several other steps are subsequently performed, shall be taken to mean that the first step is performed before any of the other steps, but the other steps can be performed in any suitable sequence, unless a sequence is further recited within the other steps. For example, claim elements that recite "Step A, Step B, Step C, Step D, and Step E" shall be construed to mean step A is carried out first, step E is carried out last, and steps B, C, and D can be carried out in any sequence between steps A and E (including with one or more steps being performed concurrent with step A or Step E), and that the sequence still falls within the literal scope of the claimed process. A given step or sub-set of steps can also be repeated.

Furthermore, specified steps can be carried out concurrently unless explicit claim language recites that they be carried out separately. For example, a claimed step of doing X and a claimed step of doing Y can be conducted simultaneously within a single operation, and the resulting process will fall within the literal scope of the claimed process.

The term "about" as used herein can allow for a degree of variability in a value or range, for example, within 10%, within 5%, within 1%, within 0.5%, within 0.1%, within 0.05%, within 0.01%, within 0.005%, or within 0.001% of a stated value or of a stated limit of a range, and includes the exact stated value or range.

The term "substantially" as used herein refers to a majority of, or mostly, such as at least about 50%, 60%, 70%, 80%, 90%, 95%, 96%, 97%, 98%, 99%, 99.5%, 99.9%, 99.99%, or at least about 99.999% or more, or 100%.

In addition, it is to be understood that the phraseology or terminology employed herein, and not otherwise defined, is for the purpose of description only and not of limitation. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

Definitions

The terms "subterranean," "subsurface," or "underground," as used herein, can refer to locations and/or geological formations beneath the Earth's surface.

The term "rock," as used herein, can refer to a relatively hard, naturally formed mineral, collection of minerals, or petrified matter. Various types of rocks have been identified on Earth, to include, for example, igneous, metamorphic, sedimentary, and the like. A rock can erode or be subject to mass wasting to become sediment and/or soil proximate to or at a distance of many miles from its original location.

The term "rock formation," as used herein, can refer to a collection of one or more rocks in a particular overall geometric arrangement.

The term "sediment," as used herein, can refer to a granular material eroded by forces of nature, but not yet to the point of becoming "soil." Sediment may be found on or within the Earth's crust. Sediment is commonly unconsolidated, although "partially consolidated sediments" are often referred to simply as "sediments" and are therefore considered to be included within the definition of sediment.

The term "sediment formation," as used herein, can refer to a collection of one type of sediment or of a plurality of types of sediments in a particular overall geometric arrangement.

The term "soil," as used herein, can refer to a granular material comprising a biologically active, porous medium. Soil is found on, or as part of, the uppermost layer of the Earth's crust and evolves through weathering of solid materials, such as consolidated rocks, sediments, glacial tills, volcanic ash, and organic matter. Although often used interchangeably with the term "dirt," dirt is technically not biologically active.

The term "geological formation," as used herein, can refer to a collection of one or more of: one or more rocks, one or more sediments, and one or more soils. in a particular overall geometric arrangement. In other words, a "geological formation" can be formed by the combination of one or more rock formations, one or more sediment formations, and/or one or more soils.

The term "reservoir," "storage rock formation," or "storage sediment formation," as used herein, can refer to a formation comprising one or more of rock, sediment, and soil that can be capable of receiving and storing an amount of fluid substantially "permanently" as that term is understood in the geological arts.

The term "fluid," as used herein, can refer to a liquid, gas, or combination thereof, or a fluid that exists above the critical point, e.g., a supercritical fluid. A fluid is capable of flowing, expanding, and accommodating a shape of its physical surroundings. A fluid can comprise a native fluid, a working fluid, or combinations thereof. Examples of fluids include, for example, air, water, brine (e.g., salty water), hydrocarbon liquids (such as those corresponding to oil or other petroleum liquids), hydrocarbon gases (such as natural gas, methane, and other lower order hydrocarbon gases), $CO_2$, magma, noble gases, or any combination thereof.

The term "native fluid," as used herein, can refer to a fluid which is resident in a rock formation or sediment formation prior to the implementation of the systems or methods of the present disclosure. A native fluid includes, but is not limited to, water, brine, saline water, oil, natural gas, hydrocarbons (e.g., methane, natural gas, oil), and combinations thereof. Carbon dioxide can also be previously present in the rock or sediment formation and thus constitute a native fluid in this case.

The term "working fluid," as used herein, can refer to a fluid that is used by the systems or methods of the present disclosure for some purpose. For example, the working fluid can be used in a machine or in a closed loop system for operation of the machine or system, such as by actuating or transferring energy to the machine or for transferring energy to or from the system. Typically, the working fluid will not be native to the rock formation or sediment formation of the reservoir, but there may be instances where a native fluid is also used as at least a portion of the working fluid. The working fluid or a portion of the working fluid can be in a supercritical state. Different working fluids can have different thermodynamic and fluid-dynamic properties, resulting in different power conversion efficiencies. Water is a primary component of the working fluid or fluids used in conventional (e.g., water-based) heat engine systems.

The terms "aqueous working fluid component" or simply "aqueous component," as used herein, refers to a portion of the working fluid that comprises water or a water-based composition, which can also include one or more components dissolved, dissociated, entrained, or otherwise dispersed in the water. Most commonly, the aqueous component of the working fluid is a water-based solution comprising water as a solute with one or more components dissolved therein, which will also be referred to herein as an "aqueous solution." A common aqueous solution that can make up at least a portion of the aqueous component is a brine solution.

The term "brine solution" (also referred to simply as "brine"), as used herein, refers to an aqueous solution comprising a relatively high concentration of dissolved salts, e.g., dissolved ions of salt compounds, primarily dissolved chloride ions ($Cl^-$) and sodium ions ($Na^+$) from sodium chloride (NaCl), but other ions can be present in other amounts, including, but not limited to, sulfate ions ($SO_4^{2-}$), magnesium ions ($Mg^{2+}$), calcium ions ($Ca^{2+}$), potassium ions ($K^+$), carbonate ions ($CO_3^{2-}$), bicarbonate ions ($HCO_3^-$), bromide ions ($Br^-$), tetrahydroxyborate ions ($B(OH)_4^-$), strontium ions ($Sr^{2+}$), and fluoride ions ($F^-$). Brine solutions typically have a salinity of at least about 3% (e.g., at least about 30 g salts per kg of the brine solution), although solutions with salinities lower than 3% can still be used to form the aqueous component of the working fluid used in the systems and methods described herein. Brine solutions can also have salinities up to full saturation of the water (e.g., around 26-28% or about 260-280 g salt per kg of solution).

The terms "non-water working fluid component" or simply "non-water component," as used herein, refers to a portion of a working fluid that is not the aqueous component. In other words, the non-water component is any component of the working fluid other than water or another aqueous component such as an aqueous solution. In the systems and methods described herein, the weight percentage of the working fluid that is taken up by the non-water component is typically substantially more than what is taken up by the aqueous component, i.e., the working fluid of the present disclosure is 10 wt. % aqueous component or less, e.g., 5 wt. % aqueous component or less, 4 wt. % aqueous component or less, 3 wt. % aqueous component or less, 2 wt. % aqueous component or less, 1 wt. % aqueous component or less, 0.5 wt. % aqueous component or less, or 0.1 wt. % aqueous component or less. Examples of materials that can form the non-water component of the working fluid can include, but are not limited to, ammonia, sulfur dioxide, carbon dioxide, and non-halogenated hydrocarbons such as methane.

In some examples, the "non-water working fluid component" or the "non-water component" is a carbon dioxide-based working fluid, also referred to as a "$CO_2$-based working fluid" or simply a "$CO_2$ working fluid" for brevity. As used herein, the terms "carbon dioxide-based" or "$CO_2$-based," e.g., when referring to a non-water component of the working fluid refers to a portion of the process stream that is predominantly carbon dioxide ($CO_2$), for example 50 wt. % or more $CO_2$, and in particular substantially more than 50 wt. % $CO_2$, such as about 75 wt. % or more $CO_2$, about 80 wt. % or more $CO_2$, about 85 wt. % or more $CO_2$, about 90 wt. % or more $CO_2$, about 95 wt. % or more $CO_2$, about 96 wt. % or more $CO_2$, about 97 wt. % or more $CO_2$ or more, about 98 wt. % or more $CO_2$, about 99 wt. % or more $CO_2$, about 99.5 wt. % $CO_2$ or more, or about 99.9 wt. % or more $CO_2$. In some examples, the $CO_2$ portion of the working fluid is supercritical $CO_2$.

In some examples, the $CO_2$-based working fluid can comprise one or more other components that are dissolvable in $CO_2$ or in which $CO_2$ can be dissolved. Typically, these other components that are part of the $CO_2$-based working fluid are organic-based compounds, such as hydrocarbons that may have been present as part of the native fluid in the reservoir. In such an example, the $CO_2$-based working fluid can help with extraction of the hydrocarbons from the reservoir by causing at least a portion of the native fluid to be released from the native fluid (e.g., to be released out of the reservoir), for example in an enhanced oil recovery ("EOR") system.

The term "$CO_2$ plume," as used herein, can refer to a large-scale (e.g., meters to several kilometers to tens of kilometers across) formation of a $CO_2$-based fluid present within subsurface pore spaces in a subterraneous reservoir. Within a $CO_2$ plume, a significant percentage of fluid in the plume formation is $CO_2$. The $CO_2$ plume can include other fluids, such as native methane or other hydrocarbons, which can be collected and carried by the $CO_2$ plume as it travels through a reservoir. For example, a $CO_2$ plume can include a substantial percentage (e.g., as much as 20 wt. %) methane that has been desorbed from a brine aquifer. A $CO_2$ plume can also include a substantial portion of native hydrocarbons (e.g., up to 90 wt. % hydrocarbons or more) and can still be considered a "$CO_2$ plume" within the meaning of the present disclosure. A $CO_2$ plume can contain a substantial portion, e.g., as much as 70% by volume, or more, of a native fluid such as brine or hydrocarbons extracted from a reservoir. The brine or other native fluid can be immobile or only minimally mobile and, therefore, generally considered in the art to be residually trapped.

The terms "geothermal heat flow," "geothermal heat," or "geothermal energy," as used herein, can refer to any kind of heat transfer in the subsurface and can include one or more of conductive heat transfer, advective heat transfer (also referred to as convective heat transfer), and radiative heat transfer (although radiative heat transfer can typically be negligible in the subsurface). A "low" heat flow generally can be considered to be less than about 50 milliwatts per square meter. A "moderate" heat flow generally can be considered to be at least about 50 to about 80 milliwatts per square meter. A "high" heat flow generally can be considered to be greater than 80 milliwatts per square meter.

The term "injection well," as used herein, can refer to a well or borehole, which can be cased (e.g., lined) or uncased, and which can contain one or more pipes through which a fluid can flow (typically in a downward direction) for purposes of releasing that fluid into the subsurface at some depth, e.g., for release into a reservoir. Multiple injection wells, e.g., two or more, for supplying the working fluid to one or more injection areas within a reservoir are also included within this definition.

The term "production well," as used herein, can refer to a well or borehole, which can be cased (e.g., lined) or uncased, and which can contain one or more pipes through which a fluid can flow (typically in an upward direction) for purposes of bringing fluids up from the subsurface, e.g., for withdrawing fluid from the reservoir up to the Earth's surface or near the surface. Multiple production wells, e.g., two or more, for drawing fluid from one or more different locations within the reservoir, i.e., to draw fluid from one or more different areas of the plume, are also included within this definition.

The term "enhanced geothermal system" (EGS), as used herein, can refer to a system in which a manmade (e.g., artificial) reservoir is created, usually by means of large-scale hydrofracturing of the subsurface, e.g., by inducing fractures to create space which can contain significant amounts of fluid. Such artificial reservoirs typically can be much smaller than natural reservoirs.

The term "enhanced oil recovery" (EOR) (also referred to as "improved oil recovery," "tertiary recovery," or "quaternary recovery"), as used herein, can refer to a system or method of recovering hydrocarbons, including, by not limited to, liquid hydrocarbons such as crude oil and hydrocarbons such as natural gas that are gaseous at atmospheric pressure and temperature, from a reservoir. EOR can include the injection of a fluid, such as carbon dioxide, or other components into the reservoir in order to improve extraction of the hydrocarbons, such as by at least one of reducing the fluid viscosity, reducing the surface tension of the hydrocarbons, or increasing pressure in the reservoir, in order to more easily remove them from the reservoir.

Geothermal Energy System

Figure 1:
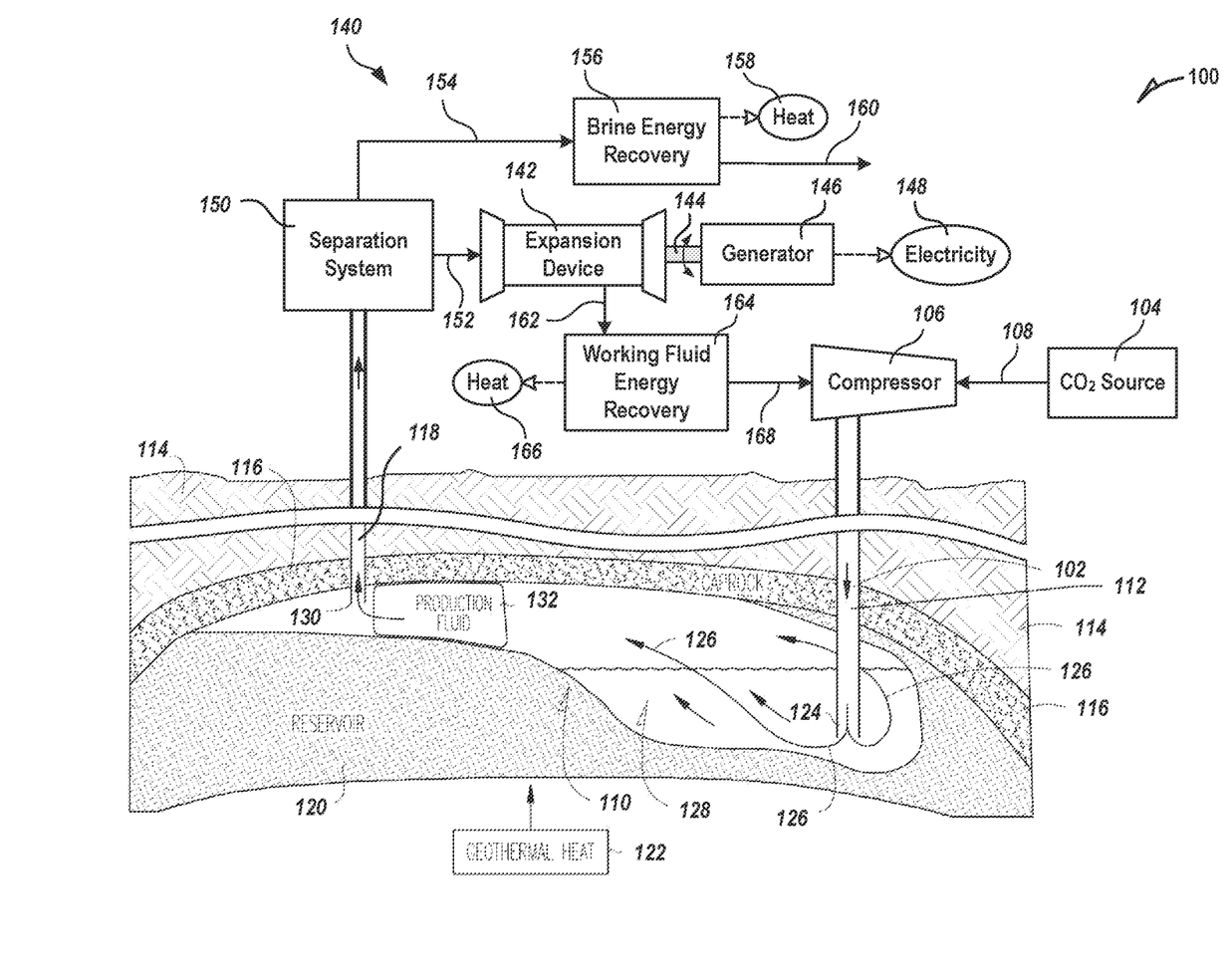
FIG. 1 is schematic diagram of a first example energy generation system.

FIG. 1 shows an example system 100 for the recovery of geothermal energy from a reservoir and for the generation of one or more other types of energy using the captured geothermal energy. FIG. 1 shows the example system 100 as capturing geothermal energy with a non-water based working fluid, e.g., with a carbon dioxide ($CO_2$) based working fluid 102. The inventors have found that the $CO_2$-based working fluid 102 is particularly useful for geothermal energy recovery. Therefore, in the descriptions of FIG. 1, the "non-water based working fluid" will be specifically referred to as "the $CO_2$-based working fluid," "the $CO_2$ working fluid," or simply "the working fluid" for the sake of brevity. Those having ordinary skill in the art will appreciate that the non-water based working fluid can include other components in addition to or in place of $CO_2$, including, but not limited to, ammonia ($NH_3$), hydrogen sulfide ($H_2S$), carbon monoxide (CO), nitrogen ($N_2$), sulfur dioxide ($SO_2$), or non-halogenated hydrocarbons such as methane ($CH_4$), or combinations thereof.

In an example, the system 100 converts geothermal heat flow from a geological formation, such as a reservoir, to another form of energy, e.g., to electricity, heat, or a combination thereof. The example system 100 shown in FIG. 1 includes several operating units that can be used to recover the geothermal energy. However, those having skill in the art will appreciate that changes can be made to the overall system 100 such that a system that is different from the overall system 100 shown in FIG. 1 can still be considered to be covered by the scope of the present disclosure.

In an example, a $CO_2$-based working fluid 102 is provided by a $CO_2$ source 104, such as a power plant, an industrial plant, another production facility, or an underground source. The $CO_2$ source 104 can be provided from an air-capture source or any other source. The carbon dioxide portion of the $CO_2$-based working fluid 102 can be in liquid form, gaseous form, supercritical form, or a mixture of two or more forms of $CO_2$. The $CO_2$-based working fluid 102 can include one or more components in addition to or in place of the $CO_2$, such as one or more of $NH_3$, $H_2S$, $CH_4$, CO, $N_2$, or $SO_2$.

In an example, the carbon dioxide portion of the $CO_2$-based working fluid 102 is supercritical $CO_2$. Supercritical carbon dioxide has an increased density, as compared with other working fluids, including gaseous carbon dioxide, such that a greater mass amount can fit into a smaller volume, thus increasing system efficiency. Additionally, supercritical carbon dioxide has favorable chemical properties and interaction characteristics with water, such as saline water. Supercritical carbon dioxide can also be used in colder conditions since it has a very low freezing point of about −55° C. (depending on the pressure). As such, a carbon dioxide-based system can be used in temperatures much lower than 0° C., such as down to −10° C. or −20° C. or −30° C. or below, down to about −55° C., including any range there between. A larger temperature differential between the heat sink (atmosphere or ambient air) and the heat source (the geothermal energy 124 in the reservoir 110), also increases the overall efficiency of the system.

In an example, the system 100 includes a compressor 106 or some other device for increasing the pressure of the $CO_2$-based working fluid 102 so that the $CO_2$ will be at a specified pressure and/or temperature, such as so that the $CO_2$ of the working fluid 102 will be supercritical. In other examples, the $CO_2$ 108 that is provided by the $CO_2$ source 104 is already supercritical and can be injected directly into a reservoir without having to use the compressor 106.

In an example, the system 100 is located at a site (i.e., in a position) configured to provide access to a target geological formation that includes a reservoir 110, wherein the working fluid 102 (e.g., the $CO_2$ 108 provided by the $CO_2$ source 104, which can be further compressed by the compressor 106) is delivered to the reservoir 110 via an injection well 112. In an example, the target geological formation includes the reservoir 110 and one or more additional geological features, such as a top layer 114 located above at least a portion of the reservoir 110, and a caprock 116 located above at least a portion of the reservoir 110 and below at least a portion of the top layer 114.

If present, the top layer 114 can include any number of layers and types of natural deposits and/or formations. For example, the top layer 114 can contain or cover one or more features such as a reservoir (e.g., the reservoir 110) or caprock (e.g., the caprock 116) having the features as described herein. The top layer 114 can include one or more layers of sediment and/or soil of varying depths, and additionally or alternatively any type of rock, including rocks or sediments in layers, rock or sediment formations, and the like, or any combinations thereof. In an example, the top layer 114 additionally or alternatively comprises a top layer or layers of sediment and/or soil of varying depths. The permeability and/or porosity of the top layer 114 may vary widely, as long as drilling can be performed to insert an injection well 112 and a production well 118. In an example, the top layer 114 can have a wide range of depths (i.e., "thickness") sufficient to ensure working fluid introduced into the reservoir 110 remains in the desired state, such as a supercritical state. In an example, the depth of the top layer 114 is at least 100 meters (m) or more, up to one (1) kilometer (km), further including more than one (1) km, such as up to three (3) km, four (4) km, five (5) km, or more, such as up to 10 km or over 15 km including any range between and including any combination of the values listed above, such as from about one (1) km to about five (5) km, below the Earth's surface (i.e., below or within a given topography in an area, which may or may not be exposed to the atmosphere). However, the target formation is not limited to any particular depth for the top layer 114.

If present, the caprock 116 can be a geologic feature overlying at least a portion of the reservoir 110. In an example, the caprock 116 has a very low permeability, i.e., in the nano-Darcy range ($10^{-6}$ millidarcies or less). A low permeability allows the caprock 116 to essentially function as a barrier for fluid contained in the reservoir 110 below. Permeability may also be dependent, in part, on the depth (i.e., thickness) of the caprock 116, as well as the depth of the top layer 114 above. The porosity of the caprock 116 can vary widely. As is known in the art, even if a rock is highly porous, if voids within the rock are not interconnected, fluids within the closed, isolated pores cannot move. In other examples, the caprock 116 may have a permeability that does not prevent or inhibit fluid leakage from the reservoir 110, but rather containment of the fluid or fluids may be because the reservoir 110 itself comprises a rock formation 120 that has a very low vertical permeability (i.e., the fluid cannot flow upward from the reservoir 110 except through the production well 118), while being sufficiently laterally permeable and porous so the fluid or fluids can readily flow across the reservoir 110, e.g., from the injection well 112 to the production well 118.

The thickness of the caprock 116 can vary but is typically substantially less than the thickness of the top layer 114. In an example, the top layer 114 has a thickness on the order of 10, or 10 to 100, up to 1000 times the thickness of the caprock 116, further including any range therebetween, although the system 100 is not limited to a caprock 116 having this thickness or even to a reservoir having a caprock at all. In an example, the thickness of the caprock 116 can vary from about one (1) cm up to about 1000 m or more, such as between about five (5) cm and 1000 m, such as between about one (1) m and about 100 m. In an example, the caprock 116 represents more than one caprock layer, such that multiple caprocks are present which partially or completely cover one another and may act jointly as a caprock 116 to prevent or reduce upward leakage of the working fluid from the reservoir 110.

In an example, the reservoir 110 comprises one or more natural underground rock formations 120 capable of containing fluids while still allowing relatively free flow of fluid within the reservoir 110 in at least one direction. The caprock 116 and the reservoir 110 can be made up of a variety of rock types, including, but not limited to: igneous rock; metamorphic rock; limestone; sedimentary rock; crystalline rock; and combinations thereof. In an example, the reservoir 110 is a previously created manmade reservoir or a portion of a previously created manmade reservoir, such as, for example, shale formations remaining from shale fracturing or other rock formations that have been opened up via large-scale hydrofracturing (also referred to as "fracking") for hydrocarbon removal, or salt domes for storing natural gas. In an example, the reservoir 110 is also capable of storing carbon dioxide on a substantially "permanent" basis, e.g., so that the reservoir 110 can be considered as a "sequestration reservoir," as these terms are understood in the art.

In an example, the natural temperature of the reservoir 110 is at least about 90° C., although the system 100 are not so limited. In an example, natural temperatures below 90° C., such as down to 80° C. or 70° C., further including down to 30° C., including any range there between, are present. Natural temperatures greater than 90° C. may also be present, with the highest temperature limited only by the magnitude of the geothermal heat flow 122 provided and the ability of the reservoir 110 to capture and retain the geothermal heat 122. In some examples, temperatures greater than about 300° C. may be present in the reservoir 110.

As noted above, the $CO_2$-based working fluid 102 is delivered to the injection well 112, wherein the $CO_2$-based working fluid 102 flows in a substantially downward direction below the Earth's surface until it reaches an injection well reservoir opening 124, through which the $CO_2$-based working fluid 102 is released into the reservoir 110.

In an example, the $CO_2$-based working fluid 102 permeates the reservoir 110 and forms a $CO_2$-based plume 126 (which may also be referred to simply as "the $CO_2$ plume 126" for brevity, even though the plume 126 may not be entirely $CO_2$). In an example, the $CO_2$ plume 126 is exposed to the temperatures of the reservoir 110, which are higher than the temperature of the $CO_2$-based working fluid 102 that is fed into the injection well 112. The $CO_2$-based working fluid 102 absorbs heat from the reservoir 110 such that the $CO_2$-based working fluid 102 is heated to a higher temperature than the temperature the working fluid 102 was at when it was injected into the reservoir 110. The heating of the $CO_2$-based working fluid 102 can result in an upwardly migrating $CO_2$-based plume 126 within the reservoir 110. In an example, the $CO_2$-based plume 126 can be laterally advected due to non-zero groundwater flow velocities within the reservoir 110 or due to the gravity differential between $CO_2$ and brine. In an example, lateral migration occurs additionally or alternatively due to the $CO_2$-based plume 126 spreading, as additional $CO_2$-based working fluid 102 exits the injection well reservoir opening 124.

In an example, the $CO_2$-based plume 126 can incorporate one or more components of a native fluid 128, which can be in the form of the one or more components being at least partially dissolved in the $CO_2$-based plume 126 or included as individual bubbles or fluid pockets of the native fluid 128 dispersed throughout the $CO_2$-based plume 126.

The $CO_2$ plume 126, which may or may not include one or more components of the native fluid 128, can migrate, be transported, flow, and/or spread towards the production well 118, where it enters a production well reservoir opening 130 and flows into the production well 118 as a production fluid 132. When the production fluid 132 reaches the production well reservoir opening 130, it can be transported via a pressure differential and/or buoyantly move in a generally upwardly direction towards the Earth's surface through the production well 118.

In an example, the $CO_2$-based working fluid 102 can interact with the native fluid 128 that is within the reservoir 110. For example, the native fluid 128 can comprise one or more hydrocarbons and the $CO_2$-based working fluid 102 can interact with the one or more hydrocarbons. In another example, the reservoir 110 comprises an aquifer, e.g., a saline aquifer, or a saline or water-filled rock formation 120 such that the native fluid 128 can include a saline solution (also referred to as "a brine solution" or simply "brine"). In an example, at least a portion of the native fluid 128, such as a portion of the one or more hydrocarbons or the brine, can combine with the original $CO_2$-based working fluid 102 to form at least one production fluid 132. In some examples, the production fluid 132 can comprise sufficient brine so that the production fluid 132 has two distinct phases (e.g., a $CO_2$ rich phase and an aqueous phase) that are comingled together. In another example, the reservoir 110 contains little to no native fluid or the native fluid 128 that is present does not interact and/or does not combine with the $CO_2$-based working fluid 102 to form the production fluid 132. Rather, the production fluid 132 may only or substantially only comprise the $CO_2$-based working fluid 102 that has absorbed geothermal heat 122 and been heated to a higher temperature.

As the production fluid 132 moves through the reservoir 110, it can become heated by the geothermal heat 122 that is present in or is supplied to the reservoir 110. The geothermal heat 122 can raise the temperature of the production fluid 132, raise the pressure of the production fluid 132, or both, and in particular raise the temperature of the $CO_2$-based working fluid 102, raise the pressure of the $CO_2$-based working fluid 102, or both, compared to the temperature of the $CO_2$-based working fluid 102 as it enters the reservoir 110 via the injection well reservoir opening 124. The heated production fluid 132 can enter the production well 118, such as through the production well opening 130. The production fluid 132 can be returned to the surface through the production well 118.

In an example, the production fluid 132 that is produced via the production well 118 can include a content of the non-water based component (e.g., the $CO_2$-based working fluid) of from about 0.01 wt. % to about 99 wt. %, inclusive, for example from about 33 wt. % to about 50 wt. %, inclusive, of the non-water based component. In an example, the production fluid 132 can include a content of the aqueous component, such as brine or an injected water-containing working fluid, of from about 1 wt. % to about 99 wt. %, inclusive, for example from about 10 wt. % to about 95 wt. %, such as from about 25 wt. % to about 50 wt. %, inclusive, of the aqueous component.

In an example, energy can be recovered from the production fluid 132 in an energy recovery system 140. The energy recovery system 140 can include any apparatus or system configured to recover energy from a portion or all of the production fluid 132. In the example shown in FIG. 1, the energy recovery system 140 includes an expansion device 142 into which at least a portion of the production fluid 132 is fed after being produced from the production well 118. The flow of fluid through the expansion device 142 produces shaft power 144, which can be used to drive a generator 146 to produce electricity 148. The expansion device 142 can comprise any suitable type of expansion device 142 known in the art, including any type of turbine, although the systems described herein are not limited to a turbine. In an example, the expansion device 142 can include, but is not limited to: a piston-cylinder device; or a scroll, screw, or a rotary compressor designed to run in reverse as engines.

As noted above, the native fluid 128 that is present in the reservoir 110 typically includes a brine solution, and as such the production fluid 132 will often include a sizable amount of brine entrained in, dissolved in, or otherwise mixed with the $CO_2$-based working fluid 102. When the native fluid 128 comprises a brine solution, then the brine is known to cause problems with one or more components of the energy recovery system 140. For example, as will be appreciated by those having skill in the art, at the relatively low temperatures for which a $CO_2$-based working fluid 102 is suited, e.g., wherein the production fluid 132 is at a temperature of from about 90° C. to about 300° C. (about 195° F. to about 575° F.) and at a pressure of from about 13,500 kPa to about 27,500 kPa (e.g., about 2000 pounds per square inch absolute (psia) to about 4000 psia), then the brine will tend to be a liquid. Expansion devices such as turbines generally are not able to operate to efficiently produce electricity when the fluid passing through the expansion device includes an aqueous-based liquid or solution. This is so because water is essentially incompressible, such that the fluid does not sufficiently expand in the expansion device, and therefore does not produce sufficient shaft power to efficiently generate electricity. Also, when there is a large percentage of water present in the production fluid 132, it will tend to increase corrosion of the expansion device 142 such that the metallurgy necessary for the components of the expansion device 142 to avoid corrosion will be substantially more expensive.

Because of these known issues when the fluid that passes through an expansion device comprises an aqueous component, it is common for a system like the energy recovery system 140 to include a separation system 150 for separating one or more components from the production fluid 132, and in particular to separate aqueous components, such as brine, from the non-water based components, such as the $CO_2$-based working fluid and/or any hydrocarbons, so as to avoid these problems. Therefore, in an example, the separation system 106 can be configured to separate the production fluid 132 into a non-water based power-generation working fluid 152 and a separated aqueous stream 154, wherein the flow rate of the separated aqueous stream 154 is selected so that the non-water based power generation working fluid 152 will have an aqueous content that is below a specified threshold, such as 10 wt. % or less. The power-generation working fluid 152 is fed into the expansion device 142 in order to generate the electricity 148 from the generator 146 connected to the expansion device 142, as described above.

In an example, the power-generation working fluid 152 primarily comprises the $CO_2$ from the original $CO_2$-based working fluid 102 that was present in the production fluid 132. In an example, the production fluid 132 may also include a portion of any hydrocarbons that may be present in the reservoir 110, e.g., as part of the native fluid 128. In an example, the one or more hydrocarbons can be dissolved in the $CO_2$-based fraction of the production fluid 132, or vice versa (i.e., wherein a portion of the $CO_2$ is dissolved in a hydrocarbon compound that had been present in the reservoir 110). As described in more detail below, the power-generation working fluid 152 comprises a relatively small weight percentage of the aqueous component that had been present in the production fluid 132 (e.g., a brine solution).

In an example, the aqueous stream 154 primarily comprises the aqueous component that had been present in the production fluid 132. In an example, the aqueous stream 154 is all or substantially all the aqueous component, such as a brine solution, e.g., wherein the aqueous stream 154 is at least about 95 wt. % brine, such as at least about 96 wt. % brine, for example at least about 97 wt. % brine, such as at least about 97.5 wt. %, for example at least about 98 wt. % brine, such as at least about 98.5 wt. % brine, for example at least about 99 wt. % brine, such as at least about 99.1 wt. % brine, at least about 99.2 wt. % brine, at least about 99.3 wt. % brine, at least about 99.4 wt. % brine, at least about 99.5 wt. % brine, at least about 99.6 wt. % brine, at least about 99.7 wt. % brine, at least about 99.8 wt. % brine, at least about 99.9 wt. % brine, at least about 99.95 wt. % brine, at least about 99.99 wt. % brine, at least about 99.995 wt. % brine, at least about 99.999 wt. % brine, at least about 99.9999 wt. % brine, or 100 wt. % brine.

The separation system 150 can include any separation operation that is known in the art for separating components from the production fluid 132. For example, the separation system 150 can include one or more operation units for separating $CO_2$ and/or hydrocarbons from aqueous components such as water or brine, or from injected fluids such as a working fluid that comprises a substantial amount of water. Examples of separation operation units that can be used for the separation of the non-water based component (e.g., the $CO_2$, hydrocarbons, or both) from the aqueous component include, but are not limited to: distillation units, such as one or more distillation columns; absorption units, such as one or more absorption columns; chromatography units; density separation units, such as centrifuges, cyclone separators, decanters and the like; crystallization or recrystallization units; electrophoresis units; evaporation or drying units; extraction units, such as leaching, liquid-liquid extraction, or solid-phase extraction; stripping units, or any process unit that exploits the density difference between water and $CO_2$ at the expected operating conditions.

The separated aqueous stream 154 can include additional heat energy, e.g., because the separated aqueous stream 154 comprises the aqueous component (e.g., brine) that had been present in the production fluid 132 and, therefore, the separated aqueous stream 154 can be at a temperature of from about AAA ° C. to about BBB ° C. (about AAA ° F. to about BBB ° F.). Therefore, in an example, the energy recovery system 140 includes an optional aqueous energy recovery subsystem 156 that is configured to convert at least a portion of the heat energy present in the separated aqueous stream 154 to heat, work, electricity, or a combination thereof. In an example, the brine energy recovery subsystem 156 can comprise a heat recovery device or system, such as a heat exchanger (not shown), which can be configured to recover heat energy 158 from the separated aqueous stream 154 to provide a cooled brine stream 160.

After passing through the expansion device 142 and generating the shaft power 144 that drives the generator 146, the power-generation working fluid 152 exits the expansion device 142 as a cooled and/or depressurized working fluid 162. The cooled and/or depressurized working fluid 162 can be injected back into the reservoir 110, such as by being re-pressurized by the compressor 106 and injected back into the injection well 112. In some examples, the cooled and/or depressurized working fluid 162 can still have substantial additional heat energy beyond that which is desired for injection back into the reservoir 110, e.g., the cooled and/or depressurized working fluid 162 can still be at a temperature and/or pressure that are higher than necessary for reinjection back into the reservoir 110. Therefore, in an example, the energy recovery system 140 can also include an optional working fluid energy recovery subsystem 164 that can convert at least a portion of the additional energy in the cooled and/or depressurized non-water based working fluid 162 to heat energy 166. For example, the working fluid energy recovery subsystem 164 can include a heat recovery device or system, such as a heat exchanger (not shown in FIG. 1) that can be configured to recover the heat energy 166 from the cooled and/or depressurized non-water based working fluid 162 in order to provide a further cooled working fluid 168. In an example, the further cooled working fluid 168 can be re-pressurized by the compressor 106 and injected back into the reservoir 110 via the injection well 112.

The cooled brine stream 160 and the cooled working fluid 168 can be further treated or processed. For example, the $CO_2$-based cooled working fluid 168 can be fed back into the reservoir 110, such as by feeding the cooled working fluid 168 into the compressor 106 for reinjection back into the injection well 112, as shown in FIG. 1. The cooled brine stream 160 can be sold as a product, further treated, delivered back into the reservoir 110, released at the land surface or injected into other subsurface formations, or can be disposed of otherwise.

A typical separation process for separating the production fluid 132 into the aqueous stream 154 from the non-water based (e.g., $CO_2$-based) power-generation working fluid 152 is a so-called "gravity separation process," which takes advantage of the difference in density between the aqueous component (e.g., with a brine solution having a specific gravity around that of water, e.g., about 1.1) and the non-water based component (e.g., with supercritical $CO_2$ having a specific gravity of about 0.75).

As will also be appreciated by those having skill in the art, because of the issues described above when the fluid that passes through an expansion device includes an aqueous component such as brine, in prior art systems, a separation system similar to the separation system 150 would be configured to remove all or substantially all of the brine solution from the production fluid 132 so that the fluid that passes into the expansion device is essentially pure $CO_2$ or substantially pure $CO_2$ or, in an example where the native fluid 128 includes one or more hydrocarbons that can be extracted by the $CO_2$-based working fluid 102, a composition comprising $CO_2$ and one or more of the hydrocarbons. However, gravity separation systems at the temperature and pressures of the production fluid 132 is expensive, especially when trying to separate out all or nearly all of the brine that is present in the production fluid 132. Gravity separation also reduces the throughput of the production fluid 132 through the energy recovery system 140, which in turn reduces the potential power output that can be produced by the energy recovery system 140.

The inventors of the subject matter of the present disclosure have discovered that, surprisingly, overall energy recovery by the energy recovery system 140 is more efficient if the separation system 150 is configured so that it only separates out a portion of the aqueous component (e.g., a brine solution) that is present in the production fluid 132 rather than configuring the separation system 150 to try and remove all or substantially all of the brine or other aqueous component or components. Specifically, the inventors of the present subject matter have discovered that the energy recovery system 140 is able to produce a surprisingly larger amount of electricity 148 when the separation system 150 is configured so that the power-generation working fluid 154 includes a non-zero specified proportion of the aqueous component that had been present in the production fluid 132, e.g., the brine portion of the native fluid 128 from the reservoir 110.

In an example, the specified portion of the aqueous component of the production fluid 132 that is not separated into the brine stream 152 by the separation system 150 is defined as a maximum specified threshold amount above which the separation system 150 is configured to separate out of the production fluid 132 to provide the power-generation working fluid 152, i.e., such that the amount of the aqueous component (e.g., brine) that is present in the power-generation working fluid 152 is no more than the specified threshold. In an example, the specified threshold is about 15 wt. % of the aqueous component in the production fluid 132, such as about 14 wt. %, about 13 wt. %, about 12 wt. %, about 11 wt. %, about 10 wt. %, about 9.5 wt. %, about 9 wt. %, about 8.5 wt. %, about 8 wt. %, about 7.5 wt. %, about 7 wt. %, about 6.5 wt. %, about 6 wt. %, about 5.5 wt. %, about 5 wt. %, about 4.5 wt. %, about 4 wt. %, about 3.5 wt. %, about 3 wt. %, about 2.5 wt. %, about 2 wt. %, about 1.5 wt. %, or about 1 wt. %. In a preferred example, the specified threshold is about 10 wt. % aqueous component that can be present in the power-generation working fluid 152 that is fed to the expansion device 142. In an example, the weight percentage of the aqueous component is selected such that the power-generation working fluid 152 primarily comprises the $CO_2$-based working fluid with small droplets of the aqueous component suspended in the $CO_2$-based fluid. When the weight percentage of the aqueous component in the power-generation working fluid 152 is too high, e.g., much higher than the specified threshold, it can result in operating conditions that will tend to corrode or break down one or more structures within the expansion device 142. For example, at the pressures that the expansion device 142 is expected to operate at, it can result in slugging, or alternating pulses of the aqueous component (which has a relatively high density) and of the $CO_2$-based component (which has a relatively low density). The alternating pulses of the aqueous component and the $CO_2$-based component through the expansion device 142 can result in surging of the expansion device 142 as well as a reduced lifespan for the expansion device 142, such as with increased wear on turbine blades within the expansion device 142.

In an example, a limiting factor in how high the specified threshold can be is the amount of the aqueous component that the expansion device 142 can effectively process, e.g., without corroding, scaling, or excessive wear on the expansion device 142. At the time of filing of the present disclosure, the most that expansion devices such as turbines are able to effectively process are working fluids with a brine content of up to 10 wt. % brine (depending on the specific mineral content of the brine solution, which can depend on the geological makeup of the reservoir 110). Therefore, in an example where the aqueous component is a brine solution, the specified threshold can be selected to be 10 wt. % brine or less. In other examples, the specified threshold can be selected to correspond to the maximum weight percentage of brine that the expansion device 142 can effectively process before excessive corrosion or other erosion effects occur.

In such a configuration, if the amount of the aqueous component present in the production fluid 132 is already below the specified threshold (e.g., the actual weight percentage of the brine that is present in the production fluid 132 is less than the weight percentage of the specified threshold), then the separation system 150 does not need to be used. In other words, the separation system 150 can either be bypassed or can simply be "turned off" when the amount of the aqueous component is below the specified threshold. This allows the energy input that would be necessary to operate the separation system 150 to be minimized or avoided if the production fluid 132 includes a small amount of the aqueous component below the specified threshold, which would save the operator of the energy recovery system 140 a substantial energy cost.

In addition, when the separation system 150 is configured so that it does not have to remove all or substantially all of the aqueous component from the production fluid 132, the separation system 150 can be operated at a much lower cost. This is particularly true as the amount of aqueous fluid that is to be allowed in the power-generation working fluid 152 gets smaller and smaller. As the specified separation threshold gets closer and closer to zero, the larger the capital cost needed for the equipment of the separation system 150 in order to achieve separation down to the specified threshold. Lower specified threshold values can also result in a larger change in temperature and/or pressure of the production fluid as it passes through the separation system 150, which can reduce the amount of electricity that can be recovered from the power-generation working fluid 152.

The inventors of the subject matter of the present disclosure have discovered yet another advantage for configuring the separation system 150 to allow the weight percentage of the aqueous component in the power-generation working fluid 152 to be up to the specified threshold. Specifically, the inventors have discovered that, surprisingly, the amount of electricity 148 that can be generated by the expansion device 142 and the generator 146 can be increased if the power-generation working fluid 152 includes at least a small portion that comprises the aqueous component. A reason for the increase in the generated electricity 148 is that the inclusion of the aqueous component in the power-generation working fluid 152 increases the overall density of the power-generation working fluid 152, which can increase the overall enthalpy of the power-generation working fluid 152 that is fed into the expansion device 142.

To demonstrate the increase in electricity generated by including a portion of the aqueous component in the power-generation working fluid 152, an example system was investigated, and the resulting data is shown below in TABLE 1. For the example system, the expansion device 142 that was used was a turbine-type expansion device. For each data point, the inlet conditions for the fluid being fed into the turbine (e.g., those of the power-generation working fluid 152 in FIG. 1) was a temperature $T_{in}$ of 149° C. (about 300° F.) and a pressure $P_{in}$ of about 55.2 megapascal (MPa) (about 544 atmospheres (atm). The outlet conditions of the fluid exiting the turbine (e.g., the cooled and/or depressurized working fluid 162 in FIG. 1) was a temperature $T_{out}$ of about 60° C. (about 104° F.) and a pressure $P_{out}$ of about 12.1 MPa (about 119 atm). The mass flow rate of the fluid was set at 100 kilograms per second (kg/sec).

TABLE 1

Enthalpy of Various Power-Generation Working Fluid Compositions

| | 100 wt. % $CO_2$ 0 wt. % Brine | 95 wt. % $CO_2$ 5 wt. % Brine | 90 wt. % $CO_2$ 10 wt. % Brine |
|---|---|---|---|
| $D_{in}$ (kg/m$^3$) | 717 | 729 | 754 |
| $D_{out}$ (kg/m$^3$) | 426 | 445 | 456 |
| $v_{in}$ (m/sec) | 1.94 | 1.91 | 1.85 |
| $v_{out}$ (m/sec) | 0.36 | 0.35 | 0.34 |

TABLE 1-continued

Enthalpy of Various Power-Generation Working Fluid Compositions

| | 100 wt. % $CO_2$ 0 wt. % Brine | 95 wt. % $CO_2$ 5 wt. % Brine | 90 wt. % $CO_2$ 10 wt. % Brine |
|---|---|---|---|
| $v_{vol.\ in}$ (m³/sec) | 0.14 | 0.14 | 0.13 |
| $v_{vol.\ out}$ (m³/sec) | 0.23 | 0.22 | 0.22 |
| $H_{in}$ (kJ/kg) | 454.6 | 518 | 526 |
| $H_{out}$ (kJ/kg) | 386 | 382 | 372 |
| $\Delta H$ (kJ/kg) | 68.6 | 136 | 154 |
| $P_{Gen}$ (kW) | 6.61 | 12.94 | 14.62 | wherein $D_{in}$ and $D_{out}$ are the density of the inlet fluid stream (e.g., of the power-generation working fluid 152) and the outlet fluid stream (e.g., of the cooled and/or depressurized working fluid 162), in kilograms per cubic meter (kg/m³); $v_{in}$ and $v_{out}$ are the fluid velocities of the inlet outlet fluid streams, respectively, in meters per second (m/sec); $v_{vol.\ in}$ and $v_{vol.\ out}$ are the volumetric fluid velocities of the inlet and outlet fluid streams, respectively, in cubic meters per second (m³/sec); $H_{in}$ and $H_{out}$ are the enthalpies of the inlet and outlet fluid streams, respectively, in kilojoules per kilogram (kJ/kg); $\Delta H$ is the change in enthalpy between the inlet and the outlet; and $P_{Gen}$ is the calculated electrical power generated, in kilowatts (kW) (i.e., the electricity 148 generated by the generator 146) based on the change in enthalpy.

As can be seen in TABLE 1, the inclusion of 5 wt. % brine and 10 wt. % brine in the power-generation working fluid results in an increase in the inlet density $D_{in}$ of about 1.7% (e.g., an increase from 717 to 729 kg/m³) and about 5.2% (e.g., an increase from 717 to 754 kg/m³), respectively, and an increase in the outlet density $D_{out}$ of about 4.5% (e.g., an increase from 426 to 445 kg/m³) and about 7% (e.g., an increase from 426 to 456 kg/m³), respectively. The fluid velocities (both linear and volumetric) are comparable and not substantially different for the 100 wt. % $CO_2$ fluid stream as compared to the 5 wt. % brine and 10 wt. % brine fluid streams.

In an example, the increase in density as well as the higher heat capacity of the brine portion of the power-generation working fluid 152, results in an increase in the inlet enthalpy and a slight decrease in the outlet enthalpy for the power-generation working fluid 152. For example, as can be seen in TABLE 1, compared to the 100 wt. % $CO_2$ fluid, the inlet enthalpy increases by about 13.9% for the 5 wt. % brine fluid (e.g., from 454.6 to 518 kJ/kg) and of about 15.7% for the 10 wt. % brine fluid (e.g., from 454.6 to 526 kJ/kg), while the outlet enthalpy decreases by about 1.04% for the 5 wt. % brine fluid (e.g., from about 386 to about 382 kJ/kg) and by about 3.63% for the 10 wt. % brine fluid (e.g., from about 386 to about 372 kJ/kg). The increases in the inlet enthalpy, and the decrease in the outlet enthalpy resulted in an increase in the enthalpy change $\Delta H$ of about 98.3% (e.g., an increase from 68.6 to 136 kJ/kg) and about 124.5% (e.g., an increase from 68.6 to 154 kJ/kg) for the 5 wt. % brine and the 10 wt. % brine fluids, respectively.

The increased enthalpy change $\Delta H$ results in a corresponding increase in the generated electrical power $P_{Gen}$ of about 95.6% (e.g., an increase from 6.61 kW to 12.94 kW) and about 121% (e.g., an increase from 6.61 kW to 14.62 kW) for the 5 wt. % brine and the 10 wt. % brine, respectively.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A system comprising:
a production well having a production well inlet in fluid communication with an underground reservoir and a production well outlet, wherein the underground reservoir is at a first temperature and contains a native fluid comprising an aqueous solution;
a working fluid that is withdrawn from the underground reservoir into the production well inlet and through the production well to the production well outlet, wherein the working fluid comprises a carbon dioxide non-water component and an aqueous component, wherein the aqueous component comprises a portion of the aqueous solution;
a separator in fluid communication with the production well outlet that separates a portion of the aqueous component from the working fluid to provide a dewatered working fluid that primarily comprises the non-water component such that the aqueous component is from about 5 wt. % to about 15 wt. % of the dewatered working fluid;
an expansion device in fluid communication with the separator so that the dewatered working fluid passes through the expansion device, wherein the expansion device converts energy in the dewatered working fluid to work energy; and
a generator that converts the work energy produced by the expansion device to electricity.

2. The system according to claim 1, wherein the separator comprises a density separator that separates the aqueous component from the non-water component.

3. The system according to claim 1, further comprising a first heat exchanger that recovers heat energy from the portion of the aqueous component separated from the dewatered working fluid by the separator.

4. The system according to claim 1, further comprising a second heat exchanger that recovers heat energy from the dewatered working fluid after it passes through the expansion device.

5. The system according to claim 1, wherein the expansion device comprises a turbine.

6. The system according to claim 1, wherein the aqueous component is about 10 wt. % of the dewatered working fluid.

7. The system according to claim 1, wherein a temperature and a pressure of the dewatered working fluid are such that the aqueous component of the dewatered working fluid is liquid.

8. A method comprising:
flowing a non-water based working fluid through an underground reservoir, the underground reservoir being at a first temperature, wherein the underground reservoir contains a native fluid comprising an aqueous solution;
wherein exposure of the non-water based working fluid to the native fluid causes at least a portion of the aqueous solution to mix with the non-water based working fluid to form a production fluid comprising a carbon dioxide non-water component and an aqueous component, wherein the non-water component comprises the non-water based working fluid and the aqueous component comprises the aqueous solution;
wherein exposure of the production fluid to the first temperature heats the production fluid to a second temperature;
flowing the production fluid at the second temperature through a production well to produce the production fluid;
separating a portion of the aqueous component from the non-water component of the production to provide a dewatered working fluid that primarily comprises the non-water component such that the aqueous component is from about 5 wt. % to about 15 wt. % of the dewatered working fluid;
passing the dewatered working fluid through an expansion device to produce work energy; and
driving a generator with the work energy to produce electricity.

9. The method according to claim 8, wherein the expansion device comprises a turbine.

10. The method according to claim 8, wherein the aqueous component is about 10 wt. % of the dewatered working fluid.

11. The method according to claim 8, wherein a temperature and a pressure of the dewatered working fluid are such that the aqueous component of the dewatered working fluid is liquid.

* * * * *